(12) United States Patent
Omiya et al.

(10) Patent No.: US 6,508,472 B2
(45) Date of Patent: Jan. 21, 2003

(54) MULTI-CHANNEL ROTARY JOINT

(75) Inventors: Junji Omiya, Osaka (JP); Jotaro Inoue, Osaka (JP); Osamu Suzuki, Osaka (JP)

(73) Assignee: Nippon Pillar Packing Co., Ltd., Osaka (JP)

( * ) Notice: Subject to any disclaimer, the term of this patent is extended or adjusted under 35 U.S.C. 154(b) by 1 day.

(21) Appl. No.: 09/884,707

(22) Filed: Jun. 19, 2001

(65) Prior Publication Data

US 2001/0052676 A1 Dec. 20, 2001

(51) Int. Cl.⁷ ................................................ F16J 15/54
(52) U.S. Cl. ......................................................... 277/408
(58) Field of Search ................................ 277/394, 395, 277/408

(56) References Cited

U.S. PATENT DOCUMENTS

| | | | | |
|---|---|---|---|---|
| 3,334,905 A | * | 8/1967 | Horwitz et al. | |
| 5,813,674 A | * | 9/1998 | Dickie et al. | |
| 5,938,205 A | * | 8/1999 | Azibert et al. | |
| 2002/0000251 A1 | * | 1/2002 | Suzuki et al. | |
| 2002/0017785 A1 | * | 2/2002 | Omiya et al. | |

* cited by examiner

Primary Examiner—Anthony Knight
Assistant Examiner—Karlena D Schwing
(74) Attorney, Agent, or Firm—Koda & Androlia (57) ABSTRACT

A multi-channel rotary joint with which a plurality of fluids of the same or different types can be made to flow as desired, including first connecting spaces sealed by mechanical seals and second connecting spaces sealed by mechanical seals and by elastic seals, such connecting spaces being between a joint housing and a rotator. A series of fluid passages that pass through the connecting spaces are also formed in the joint housing and the rotator. The mechanical seals are end-contact type seals and comprise balanced seals with a balance ratio κ such that $0 \leq \kappa \leq 1$. Each elastic seal has a U-shaped cross section and is engaged and fixed to one of the opposing peripheral surfaces in a state in which an annular groove between inner and outer peripheral lips opens into the space with the higher pressure out of the second connecting space and its adjacent space.

3 Claims, 8 Drawing Sheets

MULTI-CHANNEL ROTARY JOINT

BACKGROUND OF THE INVENTION

1. Field of the Invention

The present invention relates to a multi-channel rotary joint for allowing flow along separate routes without allowing a plurality of fluids of the same or different types to be mixed between relative rotational members in a CMP (Chemical Mechanical Polishing) apparatus (an apparatus for surface polishing of semiconductor wafers) and the like.

2. Prior Art

In the surface polishing of a semiconductor wafer with a CMP apparatus, a turntable and a top ring are individually rotated with the semiconductor wafer sandwiched in between them. The supply of a wafer polishing liquid, wafer pressurized air, wafer cleaning water (pure water), air-blowing air, or the like, or the suction discharge of polishing residue, the vacuum chucking of a semiconductor wafer and a lapping plate or the like, and so forth may be performed between the rotating member (the top ring or the turntable) and the stationary side that supports the rotating member (the CMP apparatus housing). Accordingly, a plurality of fluid routes must be provided in between the rotating member and the stationary member in order to allow a plurality of fluids of the same or different types to flow, or to control these individually.

A rotary joint is generally used as the means for forming a series of fluid passages between relative rotational members.

In one proposed rotary joint for linking the stationary fluid passages formed in a stationary member such as the CMP apparatus housing to the rotating fluid passages formed in the rotating member such as the turntable or top ring, a joint housing attached to the stationary member is rotatably linked to a rotator attached to the rotating member, a first passage linked to the rotating fluid passages is forted in the rotator, a second passage linked to the stationary fluid passages is formed in the joint housing, and a stationary seal ring provided for a first passage opening of the rotator and a movable seal ring provided for a second passage opening of the joint housing rotationally slide over each other along with the rotation of the rotator produced by the rotating member, so that the first and second passages are rotatably connected in a sealed state by such two seal rings. More specifically, with a rotary joint as described above, the series of channels connecting the rotating fluid passages to the stationary fluid passages is made up of the center holes of the two seal rings and the first and second passages.

In the rotary joint structured as described above, however, the first and second passages are linked by the seal rings along the axis of the rotator, and a plurality of channels cannot be provided.

Consequently, the rotary joint described above cannot be used when a plurality of fluids of the same or different types are allowed to flow or controlled as discussed above, and applications of the joint is greatly limited. In such a situation, a plurality of rotary joints each having a single channel are generally combined, but such a structure considerably complicates the control system such as control valves and the flow routes, which makes the CMP apparatus more complicated and bulky.

SUMMARY OF THE INVENTION

Accordingly, it is an object of the present invention to provide a multi-channel rotary joint with which a plurality of fluids of the same or different types can be made to flow as desired between relative rotational members by means of separate routes without the fluids becoming admixed, and with which the flow conditions thereof (and particularly the pressure) can be controlled individually.

It is another object of the present invention to provide a multi-channel rotary joint with which the number of routes can be freely increased or decreased within the axial length of the rotary joint by varying the number of rows of mechanical and elastic seals, and with which a rotary joint with the required number of routes can be obtained with ease.

It is still another object of the present invention to provide a practical multi-channel rotary joint which can be used to advantage in various types of rotary devices that require separate flow and control of a plurality of fluids of the same or different types between relative rotational members, and which can be used in a wide range of applications.

The above objects are accomplished by a unique structure for a multi-channel rotary joint of the present invention that comprises: a joint housing; a rotator rotatably linked to the joint housing; a plurality of mechanical seals and at least one elastic seal disposed in a row in an axial direction of the rotator between opposing peripheral surfaces of the joint housing and the rotator; at least one first connecting space sealed by two adjacent mechanical seals and being an annular space formed between the opposing peripheral surfaces, and at least one second connecting space sealed by an elastic seal and a mechanical seal adjacent thereto; and a first fluid passage passing through the first connecting space, and a second fluid passage passing through the second connecting space, wherein the mechanical seals are of end-contact types and equipped with: a stationary seal ring fixed to one of the opposing peripheral surfaces, a movable seal ring held axially slidable by another of the opposing peripheral surfaces, and a spring member that biases the movable seal ring to press against the stationary seal ring, the mechanical seals being of balanced types in which a balance ratio $\kappa$ is $0 \leq \kappa \leq 1$, and the elastic seal is equipped with: an annular main body and cylindrical inner and outer peripheral lips that protrude axially from the annular main body and are in elastically pressing contact with the opposing peripheral surfaces, the elastic seal being engaged and fixed to one of the opposing peripheral surfaces in a state in which an annular groove between inner and outer peripheral lips opens into a space with higher pressure out of the second connecting space and an adjacent space that is divided therefrom by the elastic seal.

In the above rotary joint, it is preferable for the elastic seals to be disposed on both sides of the mechanical seal group.

It is also preferable that the mechanical seal that seals at least one first connecting space be used also as a mechanical seal for sealing the first connecting space adjacent to the first connecting space.

The adjacent space divided from the second connecting space by the elastic seal includes, in addition to an atmospheric pressure space that communicates with or opens to the outside of the rotary joint, a second connecting space that is adjacent to the second connecting space. More specifically, when two second connecting spaces are provided adjacently with a single elastic seal in between, the adjacent space with respect to one of the second connecting spaces serves as the other second connecting space, and the elastic seal is disposed in a state in which the annular groove opens into the second connecting space with the higher pressure.

Also, the elastic seal is disposed in a state in which the annular groove opens into the higher pressure space, and this "higher pressure space" is determined by the relative pressure relationship between the second connecting space and its adjacent space; and, except when the adjacent space is an atmospheric pressure space, is not determined by whether the pressure is higher or lower than atmospheric pressure, that is, by whether the pressure is positive or negative.

DETAILED DESCRIPTION OF THE PREFERRED EMBODIMENTS

FIGS. 1 through 7 illustrate one embodiment of the present invention.

Figure 1:
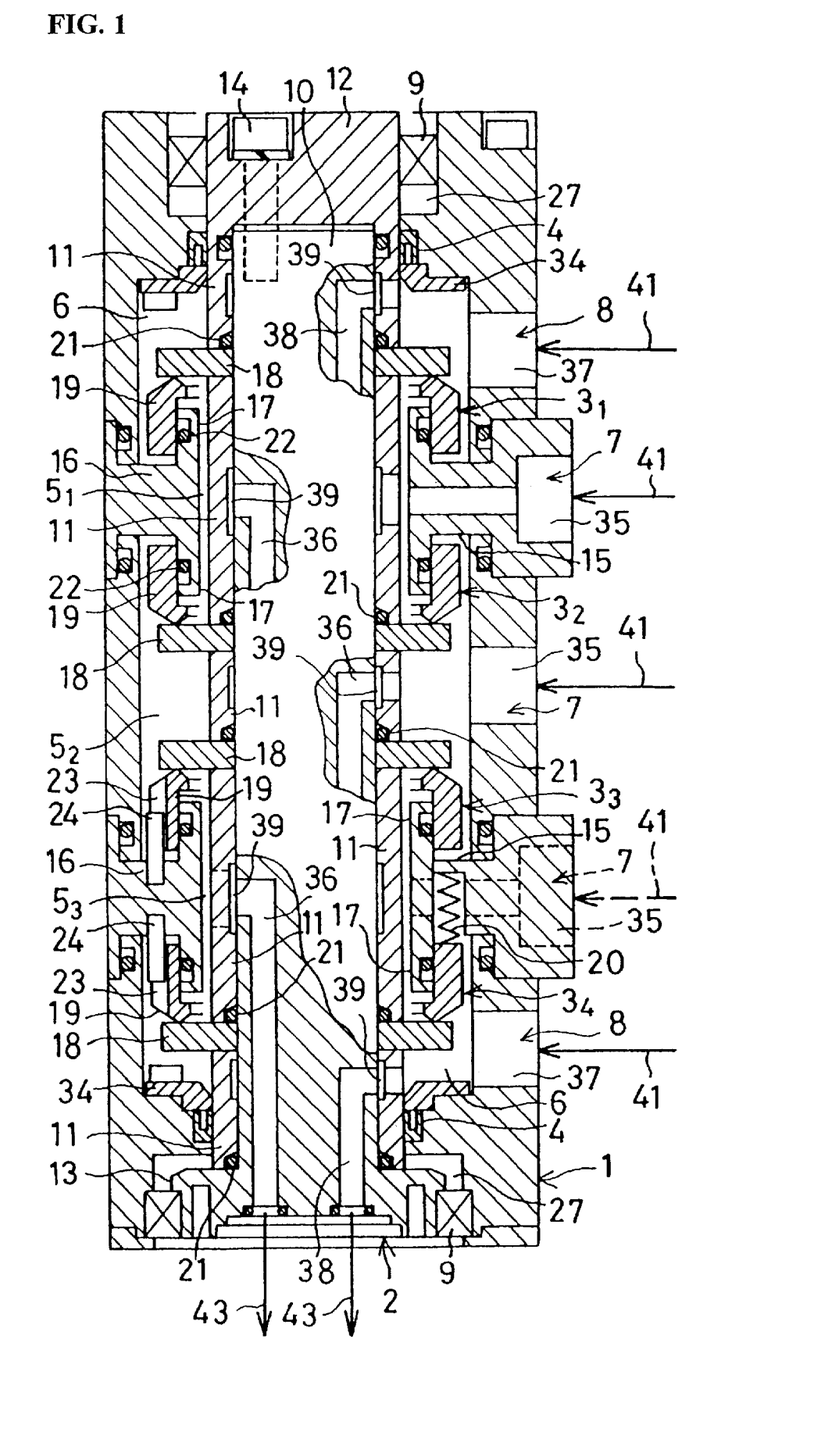
FIG. 1 is a vertical cross sectional view of one embodiment of the multi-channel rotary joint according to the present invention.

As shown in FIG. 1, the multi channel rotary joint of the present invention in this embodiment comprises a joint housing 1, a rotator 2 rotatably linked to the joint housing 1, four mechanical seals 3 and two elastic seals 4 disposed in a row in the axial direction (vertical direction) of the rotator 2 between the opposing peripheral surfaces of the joint housing 1 and the rotator 2, three first connecting spaces 5 that are annular spaces formed between the opposing peripheral surfaces and that are sealed by adjacent mechanical seal, two second connecting spaces 6 sealed by an elastic seal 4 and its adjacent mechanical seal 3, three first fluid passages 7 passing through the various first connecting spaces 5, and two second fluid passages 8 passing through the second connecting spaces 6. These passages 7 and 8 comprise a series of fluid passages that pass through the joint housing 1 and rotator 2. In the following description, "vertical" means up and down in FIG. 1.

As seen from FIG. 1, the joint housing 1 is a cylinder having an inner periphery with a circular cross section, and it is attached to a specific stationary member (such as a CMP apparatus housing that supports a rotating member such as a top ring in a CMP apparatus).

Figure 6:
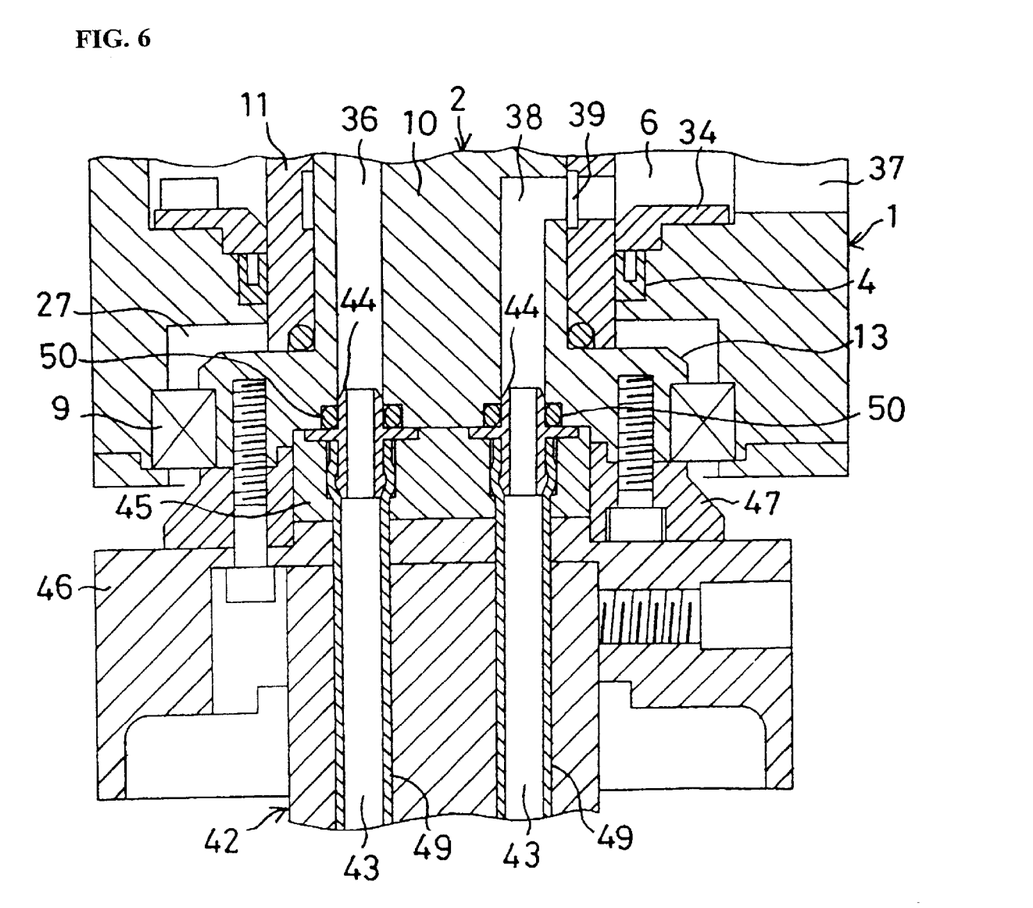
FIG. 6 is a vertical cross sectional view of the essential portion of the linkage between the rotator and the rotating member.

As shown in FIG. 1, the rotator 2 is supported concentrically and rotatably at both ends by the inner periphery of the joint housing 1 via bearings 9, and the rotator 2 is comprised of a cylindrical shaft 10, five cylindrical sleeves 11 inserted in a row a specific distance apart in the axial direction of the cylindrical shaft 10 (vertical direction), and a bearing holder 12 fastened to one end (the upper end) of the cylindrical shaft 10. As shown in FIG. 6, a large-diameter attachment component 13 for attaching to a specific rotating member (such as the top ring of a CMP apparatus) 42 is formed at the other end (the lower end) of the cylindrical shaft 10. The outer periphery of the attachment component 13 consists of a bearing holder, and the bearings 9 are installed between the opposing peripheral surfaces of the attachment component 13 and the bearing holder 12 and the joint housing 1. The bearing holder 12 is an integrally molded, bottomed cylinder, and it is attached by a bolt 14 to one end (the upper end) of the cylindrical shaft 10.

As shown in FIGS. 1 to 4, the mechanical seals 3 and the elastic seals 4 are disposed vertically in a row in the annular space surrounded by the bearings 9 and the opposing peripheral surfaces of the joint housing 1 and the rotator 2, and the elastic seals 4 are disposed on both sides (at the top and bottom) of the mechanical seal group 3. In the following description, when it is necessary to distinguish one mechanical seal 3 from the other mechanical seals 3, they will be referred to as the "first mechanical seal $3_1$," "second mechanical seal $3_2$," "third mechanical seal $3_3$," and "fourth mechanical seal $3_4$," starting from the top. When it is necessary to distinguish one first connecting space 5 from the other first connecting spaces 5, the one sealed by the first and second mechanical seals $3_1$ and $3_2$ will be referred to as the "top connecting space $5_1$," the one sealed by the second and third mechanical seals $3_2$ and $3_3$ will be referred to as the "middle connecting space $5_2$," and the one sealed by the third and fourth mechanical seals $3_3$ and $3_4$ will be referred to as the "bottom connecting space $5_3$."

The first mechanical seal $3_1$ and the second mechanical seal $3_2$ are in vertical symmetry, and they are disposed on both sides of a top support wall 15 provided for the inner periphery of the joint housing 1. Likewise, the third mechanical seal $3_3$ and the fourth mechanical seal $3_4$ are in vertical symmetry, and they are disposed on both sides of a bottom support wall 15 provided for the inner periphery of the joint housing 1. Each support wall 15 comprises an annular plate 16 protruding from the inner periphery of the joint housing 1, and a pair of cylinders 17 protruding up and down from the inner periphery of the annular plate 16. Each of the cylinders 17 is concentric with the rotator 2.

Figure 2:
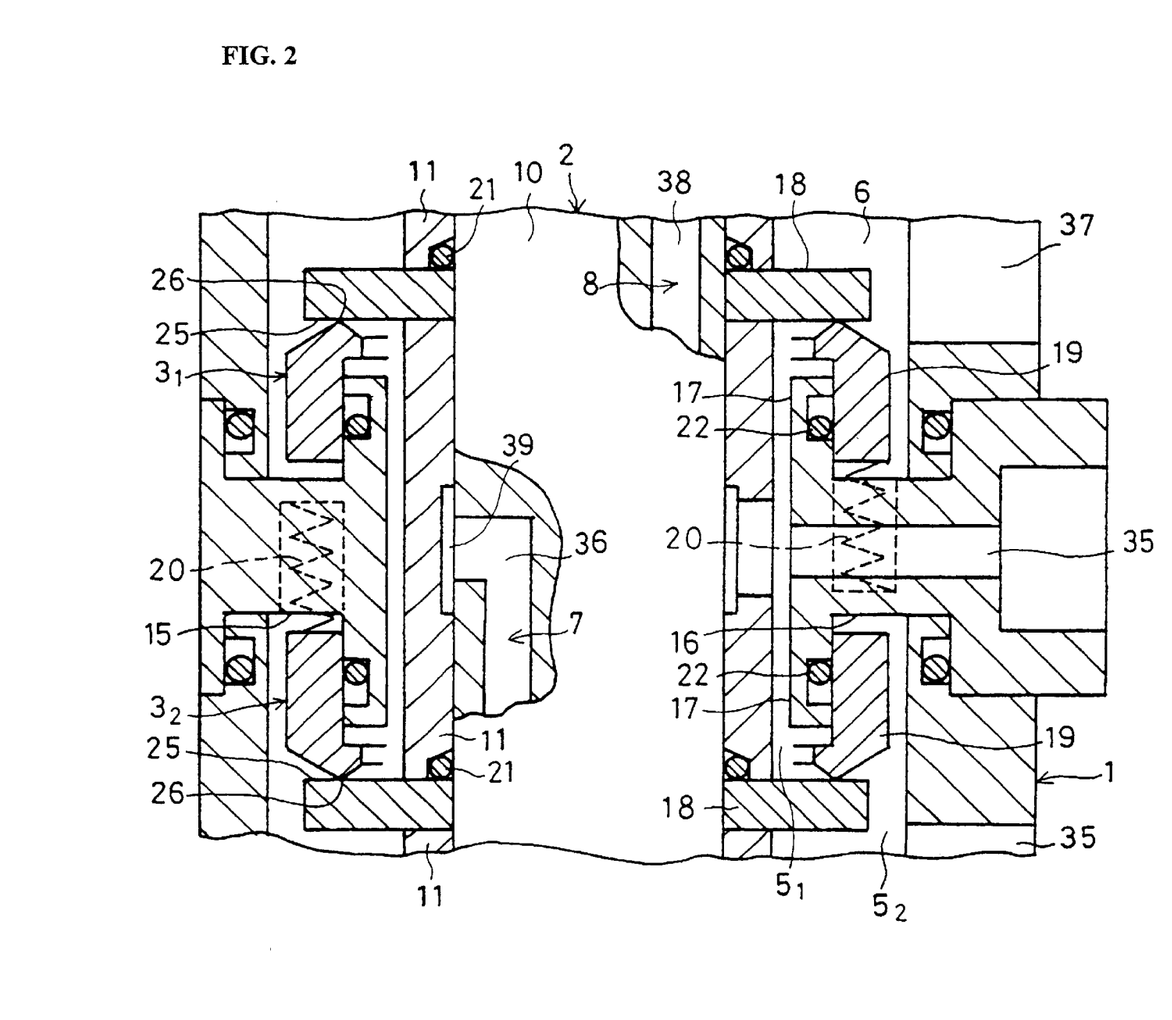
FIG. 2 is a detailed enlarged view of the essential portion of the structure shown in FIG. 1.

As shown in FIGS. 1 and 2, each mechanical seal 3 comprises a stationary seal ring 18 fixed to the outer periphery of the rotator 2, a movable seal ring 19 supported by the support walls 15, and a spring member 20 that biases the movable seal ring 19 to press against the stationary seal ring 18. Each mechanical seal 3 is an end-contact type that exhibits its sealing function through the relative rotational sliding action of the seal rings 18 and 19.

Each stationary seal ring 18 is an annular plate that is concentric with the axis of the rotator 2. The stationary seal ring 18 is fitted to the cylindrical shaft 10 and sandwiched and fixed by the adjacent sleeves 11. The sandwiching and fixing of each stationary seal ring 18 by the adjacent sleeves 11 is accomplished by tightening the bolt 14, which passes through the bearing holder 12 and is threaded into the cylindrical shaft 10. O-rings 21 are installed where the lower ends of the sleeves 11 (including those formed integrally with the bearing holder 12) abut the stationary seal rings 18 and the large-diameter portion (attachment component) of the cylindrical shaft 10.

Each movable seal ring 19 is supported facing a stationary seal ring 18, fitted via an O-ring 22 to a cylinder 17 of a support wall 15 so as to allow vertical movement. Each movable seal ring 19 is rendered incapable of relative rotation with respect to the joint housing 1 by the engagement of a drive pin 24 embedded in the annular plate 16 of a support wall 15 into a recess 23 formed in the outer periphery of the movable seal ring 19.

Each spring member 20 comprises a plurality (only one is depicted) of compressed coil springs installed between the movable seal ring 19 and the annular plate 16 of the support wall 15. The spring member 20 biases the movable seal ring 19 to be in pressing contact with the stationary seal ring 18.

Figure 3:
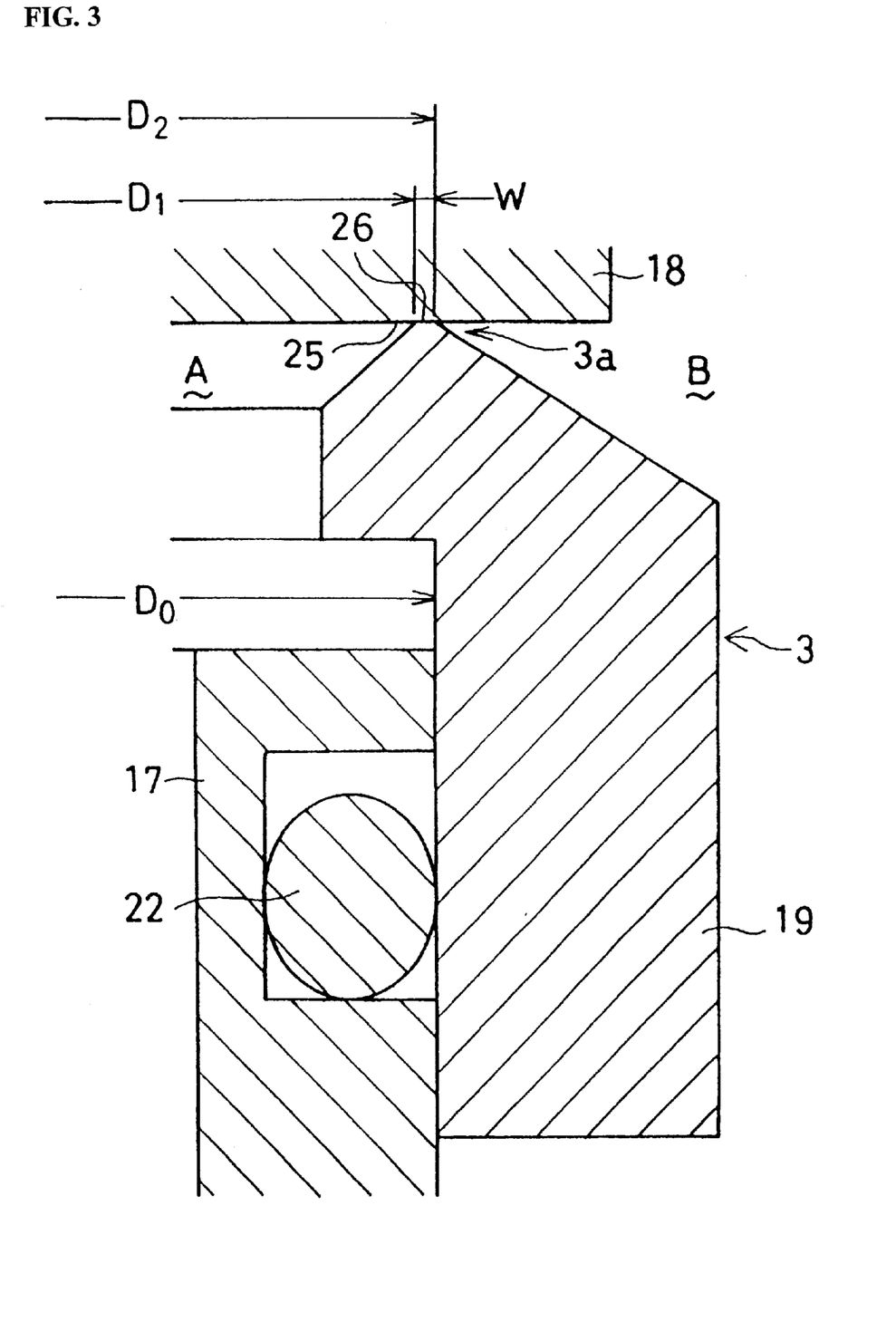
FIG. 3 is a detailed further enlarged view of the essential portion of the structure shown in FIG. 1.

Seal end faces 25 and 26, which are the contact surfaces of each stationary seal ring 18 and movable seal ring 19, are smooth, annular surfaces perpendicular to the axis of the spring member 20. As shown in FIG. 3, the portion of each movable seal ring 19 that forms the seal end face is in the form of a pointed end formed by the tapering of the inner and outer peripheral surfaces, and the radial width W of the seal end face 26 (hereinafter referred to as the "seal end face width") is microscopic.

If the fluid flowing through the first connecting spaces 5 is a slurry containing liquid-solid components or coagulated components (such as the silicon wafer polishing liquid discussed below), then there is the danger that the slurry will infiltrate between the seal end faces 25 and 26 and that the solid components or coagulated components contained therein will adhere and build up on these faces, resulting in a loss of the proper contact state of the seal end faces 25 and 26.

However, the adhesion and build-up of solid components and so forth can be effectively prevented if the seal end face width W of the seal end face 26 is made microscopic as described above. In other words, any solid components or the like that have infiltrated and accumulated between the seal end faces 25 and 26 are scraped away by the knife-edge-like seal end face 26. (This function will hereinafter be referred to as the "adhesion removal function.")

Also, making the seal end face width W microscopic and thereby keeping the contact surface area of the seal end faces 25 and 26 small effectively suppresses wear and heat generation caused by contact between the seal end faces 25 and 26 even under dry conditions. (This function will hereinafter be referred to as the "wear suppression function.")

For the adhesion removal function and wear suppression function to be manifested most effectively, it is preferable to set the seal end face width W at 1 to 5 mm. If W>5 mm, the solids removal function provided by the seal end face 26 will not be sufficiently manifested, and wear caused by contact between the seal end faces 25 and 26 cannot be effectively prevented.

On the other hand, if W<1 mm, aside from the problem of the strength of the seal end face 26, the scraping force produced by the seal end face 26 will be excessive, and there is the danger that the lubricating film formed between the seal end faces 25 and 26 will break down and the seal end faces 25 and 26 wills seize. Furthermore, the contact pressure between the seal end faces 25 and 26 will be higher than necessary, wear caused by the seal end faces 25 and 26 will not be effectively suppressed, and more wear dust will be generated. Therefore, the seal end face width W should be appropriately set within the above-described range (1 mm$\leq$W$\leq$5 mm) according to the sealing conditions (the properties of the fluid to be sealed, the pressure, and so forth).

Each mechanical seal 3 is an end-contact type in which the inner peripheral region and outer peripheral region of the relative rotational sliding portions of the seal end faces 25 and 26 are sealed by the relative rotational sliding action thereof. The mechanical seal 3 is also a balanced seal in which the balance ratio $\kappa$ is $0 \leq \kappa < 1$.

For design purposes, the balance ratio $\kappa$ of the mechanical seals 3 structured as above is determined by the inside and outside diameters $D_1$ and $D_2$ (the inside and outside diameters of the seal end face 26; $(D_1 - D_2)/2 - W$) of the relative rotational sliding portions of the seal end faces 25 and 26 and by the diameter $D_0$ of the secondary sealing portion of the movable seal ring 19 (the diameter of the inner peripheral surface of the movable seal ring in contact with the O-ring 22; hereinafter referred to as the "balance diameter"), and $\kappa = ((D_2)^2 - (D_0)^2)/((D_2)^2 - (D_1)^2)$.

As shown in FIG. 3, if Pa and Pb (Pa<Pb) are the pressure in the inner peripheral region A and outer peripheral region B of the relative rotational sliding portions (hereinafter referred to as "sealing portions") 3a of the seal end faces 25 and 26, and if F is the biasing force (spring pressure) produced by the spring member 20, then the apparent surface pressure (propulsion) P acting on this sealing portion is obtained by the equation of:

$$P = (\pi/4)((D_2)^2 - (D_0)^2)(Pb - Pa)/(\pi/4)((D_2)^2 - (D_1)^2) + (\pi/4)((D_2)^2 - (D_1)^2)F/(\pi/4)\ ((D_2)^2 - (D_1)^2) = (((D_2)^2 - (D_0)^2)/((D_2)^2 - (D_1)^2))(Pb - Pa) + F.$$

The first term coefficient $((D_2)^2 - (D_0)^2)/((D_2)^2 - (D_1)^2)$ is the balance ratio $\kappa$.

Thus, the balance ratio $\kappa$ ends up being determined by the inside and outside diameters $D_1$ and $D_2$ and the balance diameter $D_0$ of the seal end face 26, and if it is set such that $0 \leq \kappa \leq 1$, then the contact pressure of the seal end faces 25 and 26 can be suitably maintained without any major change in the above-described propulsion P, and a good seal can be achieved between the regions A and B defined by the mechanical seals 3, even when there is fluctuation in the size or sign of the pressure differential (Pb−Pa) between the regions A and B.

More specifically, if $\kappa<0$, then there will be problems such as having to raise the spring pressure F higher than necessary when Pb>Pa, and if $\kappa^1>1$, the contact pressure between the seal end faces 25 and 26 will be inadequate when Pb<Pa (such as when Pb is a negative pressure due to vacuum suction), causing problems such as leakage from the inner peripheral region A to the outer peripheral region B, but if $0 \leq \kappa \leq 1$, the above problems will not be encountered and a good seal can be achieved between the regions A and B regardless of the pressure relationship between the regions A and B.

In the shown embodiment, $\kappa$ is set to be equal to or be approximate zero by way of letting the outside diameter $D_2$ of the seal end face 26 (generally, the average diameter $(=(D_1+D_2)/2))$ and the balance diameter $D_0$ be the same or substantially the same.

When there is a fluctuation in the size of the pressure differential (Pb−Pa) between the regions A and B, if this pressure differential fluctuation is caused by pressure fluctuation in one of the regions, then the pressure differential fluctuation will have less adverse effect (fluctuation in the propulsion P) the closer to zero is the balance ratio $\kappa$ designed using that region as a reference, and when there is a fluctuation in the sign of the above-described pressure differential, then the same will apply the closer the balance ratio $\kappa$ is to 0.5. Therefore, if there is concern that the pressure differential (Pb−Pa) between the regions A and B may fluctuate in size or sign, then it is preferable if $0 \leq \kappa \leq 0.5$.

In the sealing portion 3a of the first mechanical seal 3₁, the top connecting space 5₁, which is the inner peripheral region A thereof, and the upper second connecting space 6, which is the outer peripheral region B thereof, are bounded and sealed. In the sealing portion 3a of the second mechanical seal 3₂, the top connecting space 5₁, which is the inner peripheral region A thereof, and the middle connecting space 5₂, which is the outer peripheral region B thereof, are bounded and sealed. In the sealing portion 3a of the third mechanical seal 3₃, the middle connecting space 5₂, which is the outer peripheral region B thereof, and the bottom connecting space 5₃, which is the inner peripheral region A thereof, are bounded and sealed. In the sealing portion 3a of the fourth mechanical seal 3₄, the bottom connecting space 5₃, which is the inner peripheral region A thereof, and the lower second connecting space 6, which is the outer peripheral region B thereof, are bounded and sealed.

Figure 4:
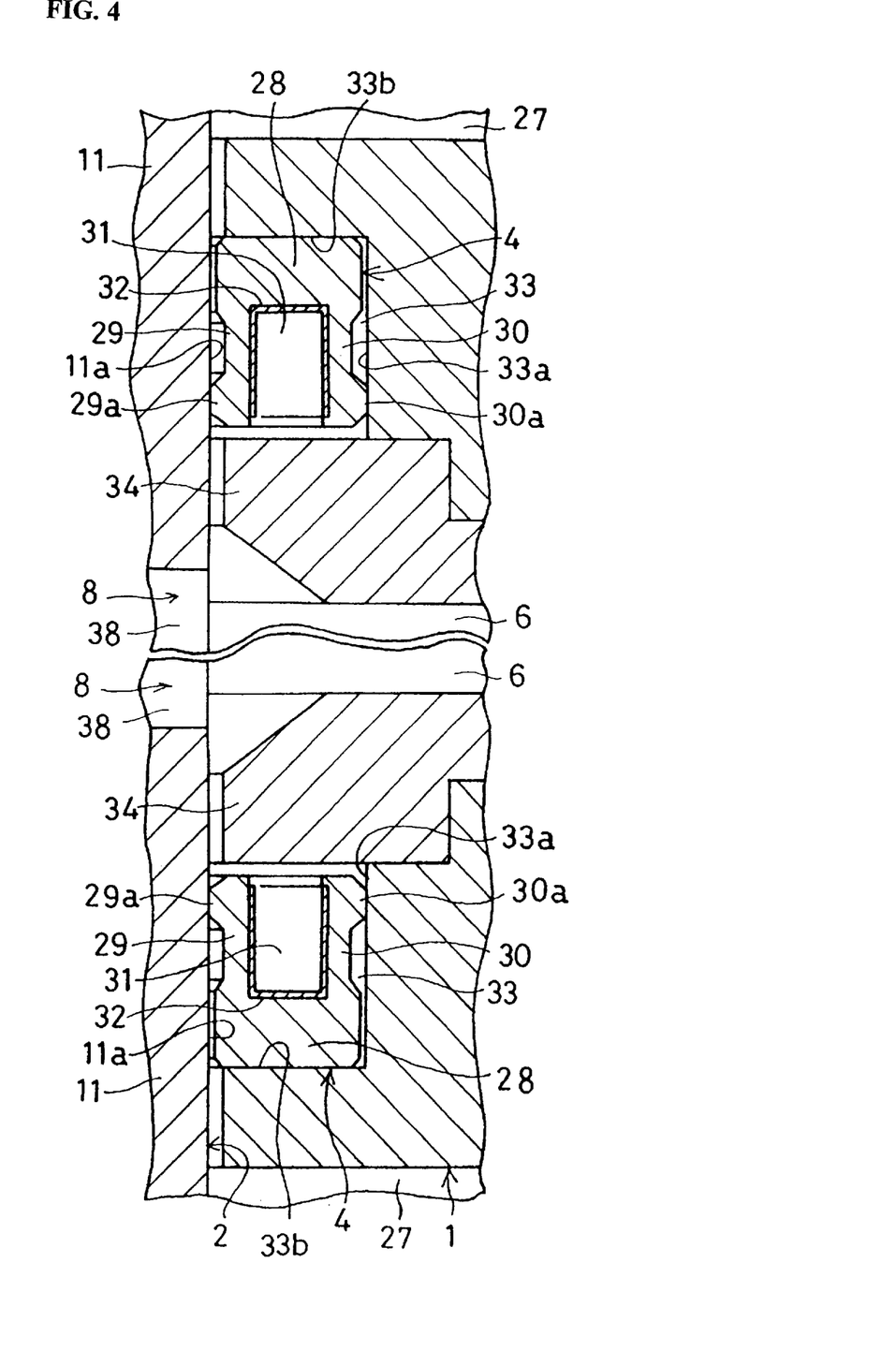
FIG. 4 is a detailed enlarged view of the essential portion of the structure shown in FIG. 1.

As shown in FIGS. 1 and 4, the, two elastic seal groups 4 are disposed between the mechanical seal groups 3 and the bearings 9, are engaged with and supported by the inner periphery of the joint housing 1, which is one of the opposing peripheral surfaces of the joint housing 1 and the rotator 2, and form the second connecting spaces 6 between the first mechanical seal 3₁ and the fourth mechanical seal 3₄. More specifically, each second connecting space 6 is an outer peripheral region B sealed by the first or fourth mechanical seal 3₁ or 3₄ and is bounded and sealed off from the region 27 where the bearing 9 is provided (hereinafter referred to as the "bearing installation region") by an elastic seal 4. The bearing installation regions 27 are atmospheric pressure regions that communicate with the outside of the rotary joint.

Figure 5:
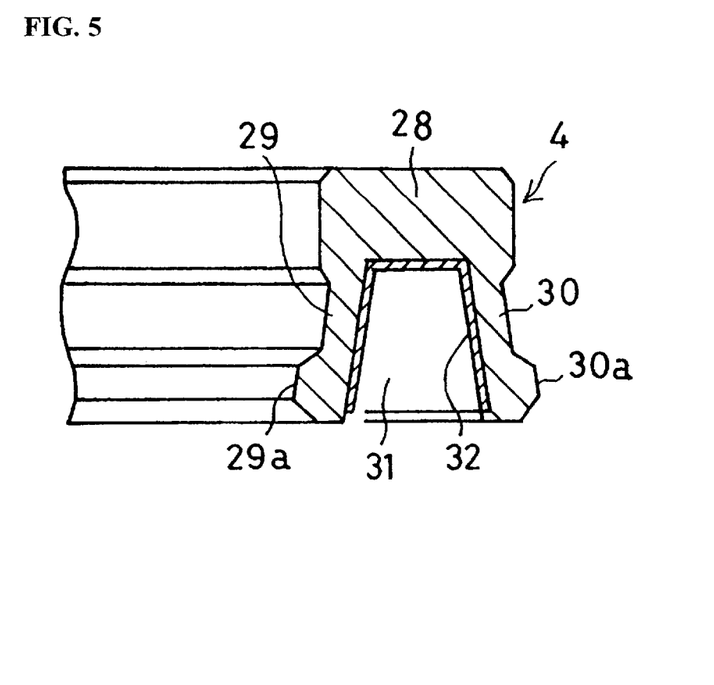
FIG. 5 is a vertical cross sectional view of the elastic seal.

As shown in FIGS. 4 and 5, each elastic seal 4 is an annular member with a substantially U-shaped cross section, comprising an annular main body 28, cylindrical inner and outer peripheral lips 29 and 30 protruding in the axial direction from the main body 28, and a spring member 32 installed in an annular groove 31 between the inner and outer peripheral lips 29 and 30. The elastic seal 4 is engaged with and supported by the inner periphery of the joint housing 1 in a state in which the annular groove 31 opens into the space with the higher pressure out of the second connecting space 6 and its adjacent space (bearing installation region) 27 defined by the elastic seal 4.

In the above structure, the bearing installation region 27 adjacent to each of the second connecting spaces 6 is an atmospheric pressure region; and since each second connecting space 6 makes up part of the supply route of the positive pressure fluid (pressurized air), as discussed below, the second connecting spaces 6 are higher in pressure than the bearing installation region 27 that is the space adjacent thereto. Therefore, each elastic seal 4 is engaged with and supported by the inner periphery of the joint housing 1 in a state in which the annular groove 31 opens into the second connecting space 6, as shown in FIGS. 1 and 4, and the inner and outer peripheral lips 29 and 30 are in elastic contact with the opposing peripheral surfaces of the joint housing 1 and the rotator 2, so that the second connecting space and the bearing installation region 27 are bounded and sealed.

The annular body with a substantially U-shaped cross section consisting of the main body 28 and the inner and outer peripheral lips 29 and 30 is molded from a plastic, rubber, or other such elastic material, with the elastic material that serves as the structural material thereof being selected according to the sealing conditions. For instance, a heat resistant elastic material is used when the fluid to be sealed by the elastic seals 4 will be very hot, and a corrosion resistant elastic material is used when the fluid to be sealed by the elastic seals 4 will be corrosive, but in general, it is favorable to use a fluororesin such as polytetrafluoroethylene (PTFE) having self-lubricity and low friction (a coefficient of friction of about 0.2 to 0.3), or an elastic composite obtained by blending this material with glass fiber, carbon fiber, molybdenum disulfide, or another such filler, for example. The material used in this example is an elastic composite with low friction, excellent wear resistance, and so forth, obtained by blending glass fiber and molybdenum ,disulfide with polytetrafluoroethylene.

Each elastic seal 4 is engaged with and supported by an annular recess 33 provided for the joint housing 1, in a state in which, an annular seal 30a protruding from the outer peripheral distal end of the outer peripheral lip 30 is made to be in elastic contact with the inner peripheral surface 33a of the annular recess 33, which is the inner periphery of the joint housing 1, and is also made to be in elastic contact with the outer peripheral surface 11a of the sleeve 11 facing the inner peripheral surface 33a.

The spring member 32 is a ring of a flat spring that has been bent into a U-shape and is installed in the annular groove 31 of the elastic seal 4. This spring member 32 biases the inner and outer peripheral lips 29 and 30 in the direction in which they spread out in their radial direction. More specifically, the spring member 32 raises the contact surface pressure of the sealing portions 29a and 30a against the sealing surfaces (the inner peripheral surface 33a of the annular recess 33 and the outer peripheral surface 11a of the sleeve 11).

With the elastic seal 4, if a fluid with a high pressure is supplied from the adjacent space (the bearing installation region 27) to the second connecting space 6, the pressure thereof causes the main body 28 to press against the side surface 33b of the annular recess 33 and causes the inner and outer peripheral lips 29 and 30 to be pushed and deformed in the direction in which they spread apart in their radial direction.

More specifically, the pressure of the fluid raises the contact surface pressure of the sealing portions 29a and 30a on the sealing surfaces 11a and 33a, so that the sealing function of the elastic seal 4 is sufficiently manifested. The increase in contact surface pressure is proportional to the pressure of the fluid supplied to the second connecting space 6.

Therefore, the contact surface pressure, that is, the sealing force, varies proportionally according to the pressure of the fluid supplied to the second connecting space 6, and the sealing function of the elastic seal 4 is sufficiently manifested whether the fluid pressure is high or fluctuates (on the condition, however, that the fluctuation is within a range in which the pressure is higher than that in the adjacent space bearing installation region 27, that is, within the range of positive pressure).

Two side walls of the annular recess 33 serve to prevent the elastic seal 4 from coming out of the annular recess 33 in the axial direction, but the design in this structure is such that one side wall consists of an annular member 34 attached to the joint housing 1, and the elastic seal 4 can be easily inserted into and removed from the annular recess 33 by attaching or removing the annular member 34.

Each first fluid passage 7 is a series of passages in which a first housing channel 35 formed in the joint housing 1 communicates with a first rotator channel 36 formed in the rotator 2 through a first connecting space 5, and each second fluid passage 8 is a series of passages in which a second housing channel 37 formed in the joint housing 1 communicates with a second rotator channel 38 formed in the rotator 2 through a second connecting space 6. The housing channels 35 and 37 pass through the peripheral walls of the joint housing 1 and open at one end into a connection space 5 and 6, respectively, and open at the other end into the outer periphery of the joint housing 1. Of the first housing channels 35, those that open into the top connecting space $5_1$ and the bottom connecting space $5_3$ pass through the support walls 15. The rotator channels 36 and 38 respectively pass through the shaft 10 and the sleeve 11, open at one end into the connection spaces 5 and 6, and open at the other end into the bottom end of the shaft 10.

The portions of the rotator channels 36 and 38 that pass through the shaft communicate with the portions that pass through the sleeve via an annular groove 39 formed between the shaft 10 and the sleeve 11.

In the fluid passages 7 and 8, the housing channels 35 and 37, which are at one end thereof, are connected to stationary fluid passages 41 (fluid passages formed in the stationary member to which the joint housing 1, is attached), and the rotator channels 36 and 38, which are at the other end thereof, are connected to rotator fluid passages 43 (fluid passages formed in the rotating member 42 to which the rotator 2 is attached), which allows the stationary fluid passages 41 and the rotator fluid passages 43 to communicate rotatably.

In this structure, the supply and discharge route for the silicon wafer polishing liquid is made up of the first fluid passages 7 passing through the top connecting space $5_1$ and the bottom connecting space $5_3$, and the stationary fluid passages 41 and rotator fluid passages 43 connected to these. This allows switching between a positive pressure mode and a negative pressure mode.

More specifically, in the above supply and discharge route, it is possible to switch between a positive pressure mode, in which pressurized air and silicon wafer polishing liquid (such as one in which isopropyl alcohol has been added to a silica slurry containing KOH as an alkali component) are supplied from the stationary member to the rotating member 42, and a negative pressure mode, in which any silicon wafer polishing liquid remaining along this route is discharged under vacuum suction. Therefore, the pressure inside the first fluid passages 7, including the top connecting space $5_1$ and the bottom connecting space $5_3$, fluctuates between positive and negative. The route consisting of the first fluid passages 7 passing through the middle connecting space $5_2$ and the stationary fluid passages 41 and rotator fluid passages 43 connected to these, and the route consisting of the second fluid passages 8 passing through the second connecting spaces 6 and the stationary fluid passages 41 and rotator fluid passages 43 connected to these are both used for supplying pressurized air, and the pressure inside the fluid passages 7 and 8 that make up these routes is always positive.

Figure 7:
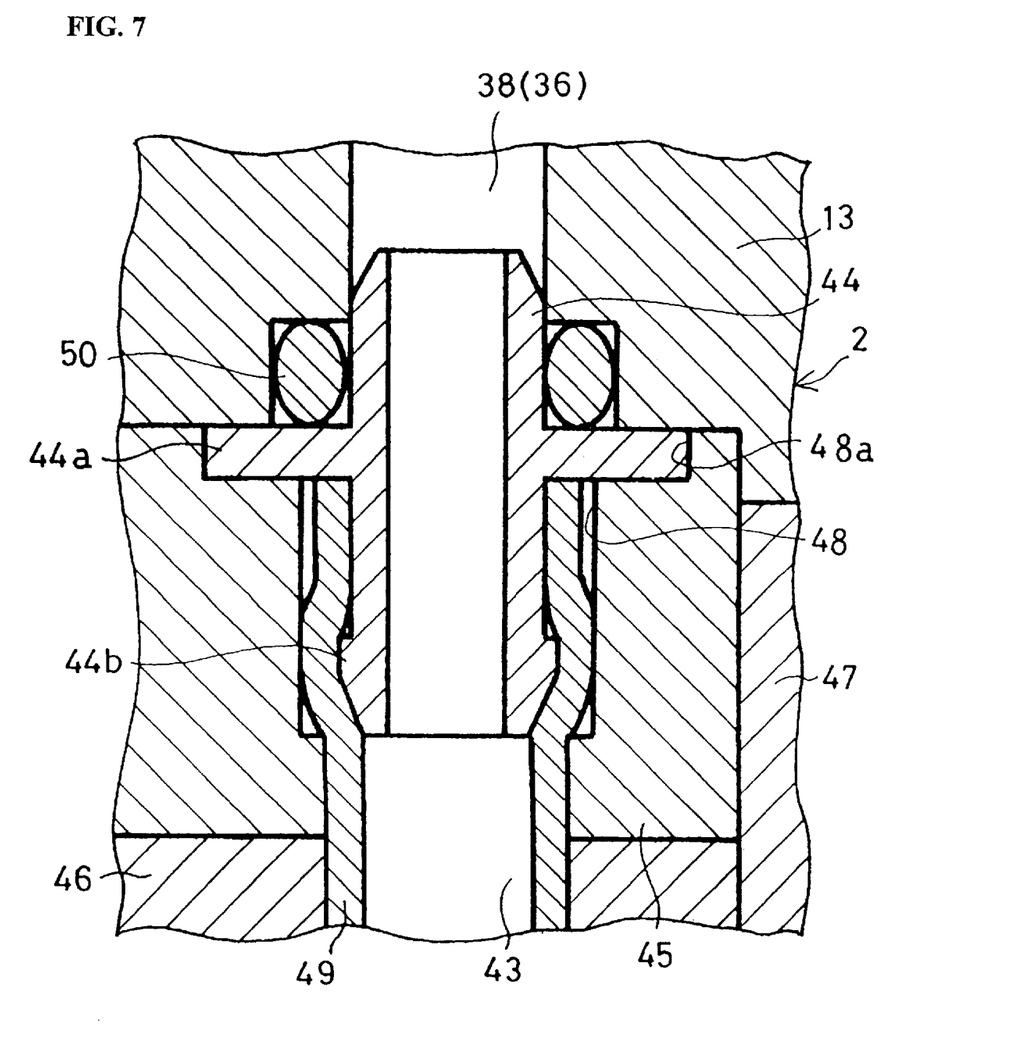
FIG. 7 is a detailed enlarged view thereof.

As shown in FIGS. 6 and 7, the linking of the rotator channels 36 and 38 with the rotator fluid passages 43 is designed such that it can be easily carried out via connectors 44 and a seal cap 45.

More specifically, an annular flange 46 is attached to the top end of the rotating member 42, and the flange 46 is attached to an attachment component 13 of the shaft 10 via an annular adapter 47, the result of which is that the rotating member 42 communicates with the rotator 2.

The adapter 47 is fitted with a disk-shaped seal cap 45, and the seal cap 45 is sandwiched between the shaft 10 and the flange 46. Communicating holes 48 that are perpendicular to the rotator channels 36 and 38 are formed in the seal cap 45.

Plastic pipes 49 are inserted through the rotating member 42, pass through the flange 46 at the top, and protrude into the communicating holes 48 of the seal cap 45; and the rotator fluid passages 43 are formed by these plastic pipes 49. As shown in FIG. 7, the rotator channels 36 and 38 communicate with the plastic pipes 49 by means of cylindrical connectors 44 having annular flanges 44a in the middle.

The bottom portions of the connectors 44 are press-fitted to the tops of the plastic pipes 49. A downward tapering annular step 44b is formed at the bottom of each of the connectors 44. When these annular steps 44b are press-fitted into the plastic pipes 49 while elastically expanding the pipes outward radially, the connectors and the plastic pipes 49 communicate in a sealed state.

The diameter of the communicating holes 48 of the seal cap 45 is set to be large enough to permit the radial distortion of the plastic pipes 49, and latching components 48a that latch the annular flanges 44a of the connectors 44 are formed at the tops of the communicating holes 48.

The top portions of the connectors 44, that is, the portions protruding above the top surface of the seal cap 45, protrude into the lower ends of the rotator channels 36 and 38; and these portions are sealed by O-rings 50 engaged with and supported by the bottom ends of the rotator channels 36 and 38.

Therefore, the connectors 44 are press-fitted to the top ends of the plastic pipes 49 with the seal cap 45 in place, after which the flange 46 is made to communicate with the adapter 47 and the attachment component 13 of the shaft 10, the result of which is that the upper end portions of the connectors 44 are inserted through the O-rings 50 and linked to the rotator channels 36 and 38.

More specifically, the linking of the rotator channels 36 and 38 with the rotator fluid passages 43 via the connectors 44 is accomplished simultaneously by the linking of the rotator 2 with the rotating member 42, and the rotator channels 36 and 38 can be easily linked with the rotator fluid passages 43.

In addition to being selected according to the required function and mechanical strength, the materials of which the various members of the rotary joint are made must also be selected according to the properties of the fluids that will be flowing through the fluid passages 7 and 8 and to the intended application. It is generally preferable to select materials that are inert with respect to these fluids.

A structural material that is inert with respect to a fluid is determined through its relationship to the properties of that fluid and the usage requirements (such as avoidance of metal contamination). For instance, when metal contamination is to be avoided, such as when the fluid is a polishing liquid, cleaning liquid, or the like used in the processing of a semiconductor wafer, such a material would be a ceramic or plastic that does not generate metal dust or elute metal components through contact with the fluid.

When the fluid is a slurry containing solid components such as polishing grains, such a material would be a ceramic or plastic that does not generate dust through contact with the contained solid components. In the case of a high-temperature fluid, a ceramic or plastic that is heat resistant would be used, whereas in the case of a corrosive fluid, a ceramic or plastic that is resistant to corrosion and chemicals would be used.

Therefore, it is generally preferable for the seal rings 18 and 19 in each of the mechanical seals 3 to be made of a ceramic such as silicon carbide or aluminum oxide that tends not to generate abrasion dust through contact. Naturally, depending on the usage conditions, it is also possible to use one of the engineering plastics discussed below. In this structure, the seal rings 18 and 19 of the mechanical seals 3 are all made of silicon carbide.

It is preferable for fluid contact portions other than the seal rings 18 and 19 (including any portions that might come into contact with the fluid through infiltration) to be made of an engineering plastic such as PEEK (polyether ether ketone), PES (polyethersulfone), or PC (polycarbonate) that does not generate particles through contact with polishing grains or other such solid components and that has excellent dimensional stability in machining, heat resistance, and so forth, or a fluorore sin such as PTFE (polytetrafluoroethylene plastic), PFA (tetrafluoroethylene perfluoroalkoxy vinyl ether copolymer), FEP (fluomated ethylene propylene copolymer plastics), or PVDF (polyvinylidene fluoride) with excellent corrosion resistance and chemical resistance.

Configurations in which the fluid contact portions of the fluid passages 7 and 8 are made of a selected material can be roughly grouped into using the selected material for some or all of the portions formed by the fluid passages 7 and 8, and using selected material layer by means of coating, pipe press-fitting, or the like for just the fluid contact portions (such as the inner walls of the channels 35, 36, 37, and 38). The latter is particularly effective when the fluid passages 7 and 8 are formed in members or portions that unavoidably must be made of a metal material such as stainless steel due to such considerations as mechanical strength. The connectors 44 and plastic pipes 49 are also made of the above-described selected material as dictated by the properties of the fluid passing therethrough and so on.

In the multi-channel rotary joint structured described above, the mechanical seals 3 that seal the first connecting spaces 5 from their adjacent spaces (the first and second connecting spaces 5 and 6) consist of balanced seals. Accordingly, even if there is a pressure fluctuation between the first connecting spaces or the adjacent spaces 5 and 6, or if there is a fluctuation in the pressure differential between these spaces, the contact pressure between the seal rings 18 and 19 in these mechanical seals 3 will still be maintained at the proper pressure, and a good seal will be preserved between the first connecting spaces 5 and their adjacent spaces 5 and 6. The first fluid passage 7 passing through the first connecting spaces 5 can, therefore, be used as a fluid route through which a fluid can flow regardless of the pressure conditions. For instance, as in the example given above, the first fluid passage 7 passing through the top connecting space $5_1$ or the bottom connecting space $5_3$ can be used favorably as a fluid route that undergoes major pressure fluctuations (a silicon wafer polishing liquid supply and discharge route that can be switched between positive and negative pressure modes).

The second fluid passages 8 passing through the second connecting spaces 6, in which the second connecting spaces 6 are properly sealed off from their adjacent spaces (the first connecting spaces 5 and the bearing installation regions 27) by the mechanical seals 3 and the elastic seals 4, can also be used favorably as fluid routes that are free of leaks.

More specifically, even when there is fluctuation in the pressure relationship between the second connecting spaces 6 and their adjacent first connecting spaces 5 as above, these spaces 5 and 6 can still be properly sealed by the mechanical seals 3.

Meanwhile, the second connecting spaces 6 are sealed off from the bearing installation regions 27 by the elastic seals 4, whose sealing function is inferior to that of the mechanical seals 3, but as described above, because the contact pressure of the sealing portions 29a and 30a against the sealing surfaces (the inner peripheral surface 33a of the annular recess 33 and the outer peripheral surface 11a of the sleeve 11) increases and decreases in proportion to the pressure of the fluid (pressurized air) supplied to the second connecting spaces 6, the proper sealing function for the pressure of that fluid is always achieved. Therefore, the proper fluid flow is performed in the second fluid passage 8 as well.

Thus, the plurality of fluid passages 7 and 8 constitute independent, leak-free fluid routes, and a plurality of fluids can be made to flow as desired without being mixed in the stationary fluid passages 41 and the rotator fluid passages 43, allowing the pressure of these fluids to be controlled as needed.

Also, the mechanical seals 3 take up much installation space in the axial direction, but because the elastic seals 4, which take up less installation space in the axial direction, are disposed on both sides of the mechanical seal group 3, and the two spaces defined by the mechanical seals 3 are both utilized as the first and second connecting spaces 5 and 6, the space in the axial direction required for the plurality of connecting spaces 5 and 6 can be greatly reduced as compared to when only one of the two spaces defined by the mechanical seals 3 is utilized as the first or second connecting space 5 and 6. Therefore, the plurality of fluid passages 7 and 8 can be formed without increasing the axial length of the rotary joint any more than necessary.

The present invention is not limited to the embodiments described above, and it can be modified and improved as needed to the extent that such a modification and improvement does not exceed the basic principle of the present invention.

Figure 8:
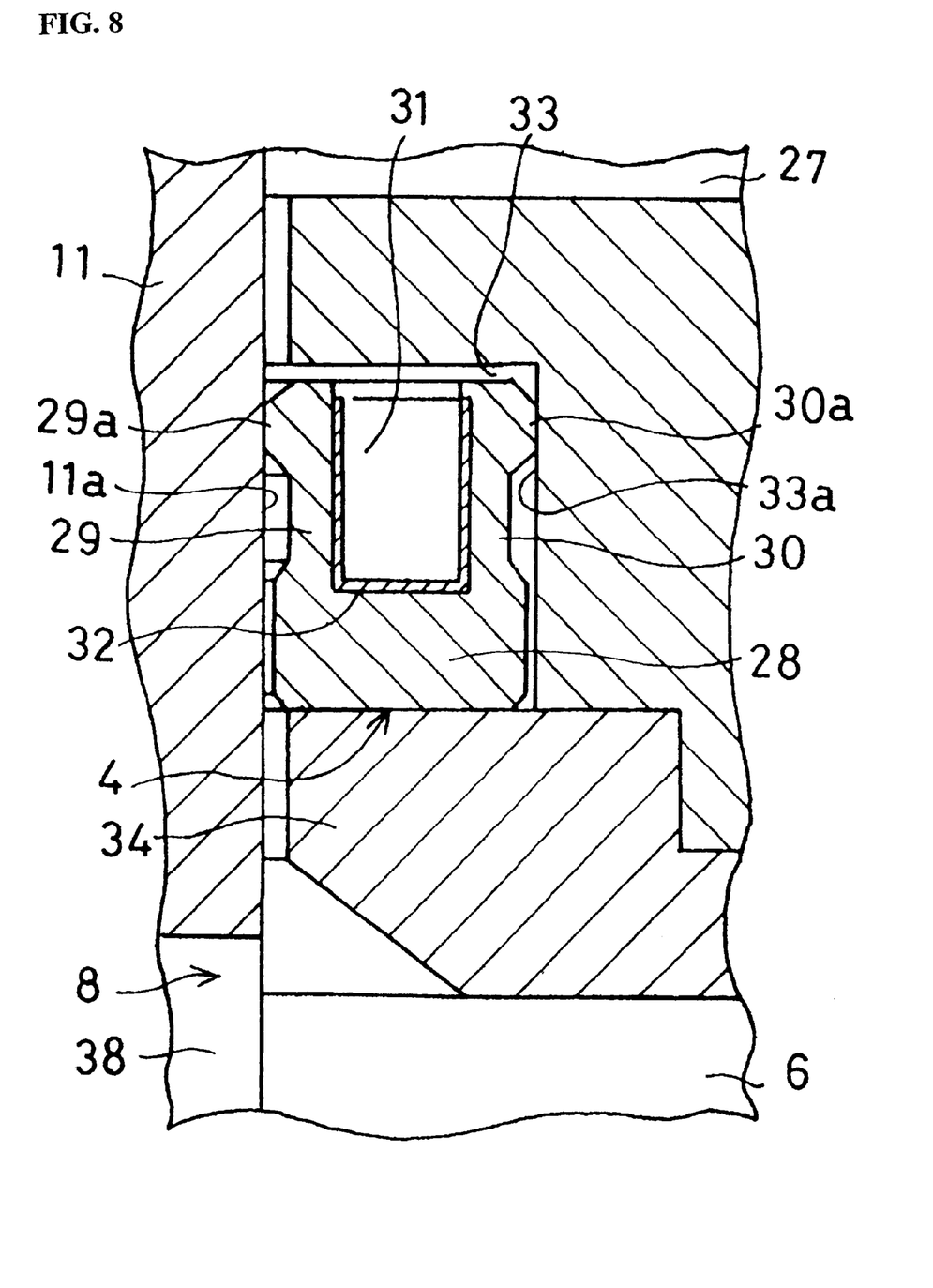
FIG. 8 is a vertical cross sectional view of the essential portion of a modified structure for installing the elastic seal.

For instance, the disposition configuration of the elastic seals 4 is determined by the pressure relationship between the second connecting spaces 6 and their adjacent spaces defined thereby; and when the second connecting spaces 6 are lower in pressure than their adjacent spaces, the elastic seals 4 are disposed in the opposite direction from that in the above example, so that the annular grooves 31 open into the adjacent spaces. In other words, when the upper second connecting space 6 in the above-described rotary joint is used as a vacuum suction route, the elastic seal 4 is disposed as shown in FIG. 8 so that the annular groove 31 opens into the bearing installation region 27, which is at a higher pressure (atmospheric pressure), rather than into the second connecting space 6, which is at a lower pressure (negative pressure) than the bearing installation region 27. In this case, when the second connecting space 6 reaches negative pressure, the main body 28 presses against the annular member 34 and, just as in the above example, the inner and outer peripheral lips 29 and 30 are pressed against the sealing surfaces 11a and 33a, the contact pressure of the sealing portions 29a and 30a against the sealing surfaces 11a and 33a increases in proportion to the degree of negative pressure in the second connecting space 6 (the degree of pressure differential with the adjacent space (the bearing installation region 27)), and the sealing function of the elastic seal 4 is sufficiently manifested.

Figure 9:
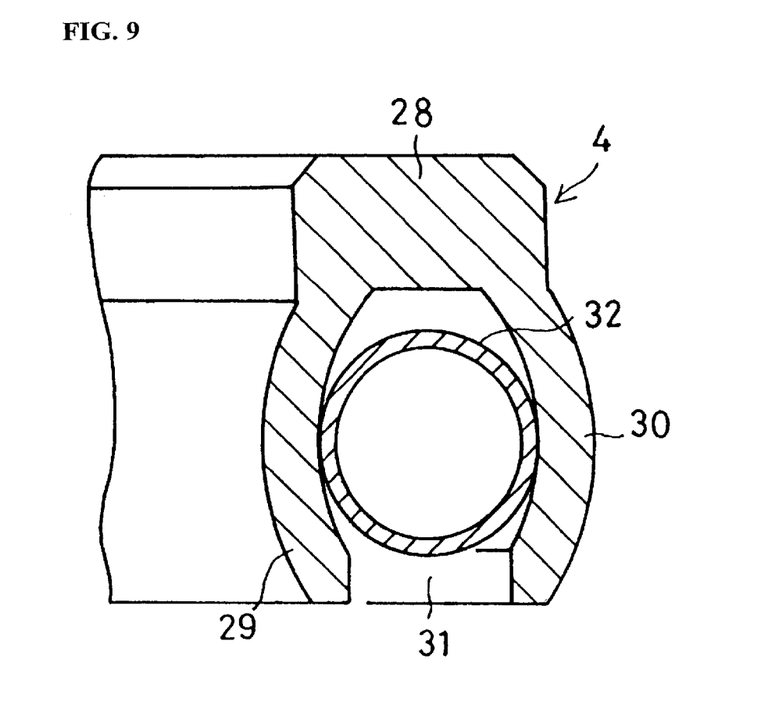
FIG. 9 is a vertical cross sectional view that corresponds to FIG. 5 and illustrates a modified example of the elastic seal.

The shape and structure of the elastic seals 4 can also be suitably modified and improved according to the sealing conditions and so forth. For instance, as shown in FIG. 9, the inner and outer peripheral lips 29 and 30 can be curved and a coil spring used as the spring member 32 installed in the annular groove 31.

Also, because the mechanical seals 3 that seal the first connecting spaces 5 consist of balanced seals, and a good sealing function can be achieved regardless of the pressure relationship between the first connecting spaces 5 and their adjacent spaces (the first and second connecting spaces 5 and 6), the first fluid passage 7 passing through the first connecting spaces 5 can serve as a favorable fluid route under any and all pressure conditions and is not limited to the example given above. For instance, the first fluid passage 7 passing through the middle connecting space $5_2$ can also be used as a fluid route that needs to be switched between positive and negative pressure modes, just as with the other first fluid passages 7. Also, the number of mechanical seals 3 installed and the number of first connecting spaces 5 can be set as desired.

What is claimed is:

1. A multi-channel rotary joint, characterized by comprising:

a joint housing;

a rotator rotatably linked to said joint housing;

a plurality of mechanical seals and at least one elastic seal disposed in a row in an axial direction of said rotator between opposing peripheral surfaces of said joint housing and said rotator;

at least one first connecting space sealed by two adjacent mechanical seals of said plurality of mechanical seals of said plurality of mechnical seals and having an annular space formed between said opposing peripheral surfaces, and at least one second connecting space sealed by an elastic seal and a mechanical seal adjacent thereto; and a first fluid passage passing through said first connecting space, and a second fluid passage passing through said second connecting space, wherein said mechanical seals are end-contact type and equipped with:

a stationary seal ring fixed to one of said opposing peripheral surfaces, a movable seal ring held axially slidable by another of said opposing peripheral surfaces, and a spring member that biases said movable seal ring to press against said stationary seal ring, said mechanical seals being of balanced types in which a balance ratio κ is $0 \leq κ \leq 1$, and said elastic seal is equipped with:

an annular main body and cylindrical inner and outer peripheral lips that protrude axially from said annular main body and are in elastically pressing contact with said opposing peripheral surfaces, said elastic seal being engaged and fixed to one of said opposing peripheral surfaces in a state in which an annular groove between inner and outer peripheral lips opens into said second connecting space having a higher pressure than an adjacent space that is divided there from by said elastic seal.

2. The multi-channel rotary joint according to claim 1, wherein elastic seals are disposed on both axial sides of each mechanical seal.

3. The multi-channel rotary joint according to claim 1, wherein said mechanical seal that seals said at least one first connecting space is used also as another mechanical seal for sealing a first connecting space that is adjacent to said at least are first connecting space.

* * * * *

UNITED STATES PATENT AND TRADEMARK OFFICE
CERTIFICATE OF CORRECTION

PATENT NO. : 6,508,472 B2
DATED : January 21, 2003
INVENTOR(S) : Junji Omiya et al.

It is certified that error appears in the above-identified patent and that said Letters Patent is hereby corrected as shown below:

<u>Title page,</u>
Item [30], Foreign Application Priority Data, add
-- June 19, 2000      (JP) ……….. 2000-183838 --

Signed and Sealed this

Twenty-first Day of June, 2005

JON W. DUDAS
*Director of the United States Patent and Trademark Office*